US012592818B2

(12) United States Patent
Das et al.

(10) Patent No.: US 12,592,818 B2
(45) Date of Patent: Mar. 31, 2026

(54) TAMPER RESPONSE AGAINST PHYSICAL AND LOGICAL ATTACKS ON AN HSM

(71) Applicant: THALES DIS CPL USA, INC., Austin, TX (US)

(72) Inventors: Sumant Das, Davie, FL (US); Indresh Singh, Delray Beach, FL (US)

(73) Assignee: THALES DIS CPL USA, INC., Austin, TX (US)

( * ) Notice: Subject to any disclaimer, the term of this patent is extended or adjusted under 35 U.S.C. 154(b) by 30 days.

(21) Appl. No.: 18/822,595

(22) Filed: Sep. 3, 2024

(65) Prior Publication Data

US 2026/0067079 A1 Mar. 5, 2026

(51) Int. Cl.
H04L 9/08 (2006.01)
G06F 21/72 (2013.01)

(52) U.S. Cl.
CPC ............ H04L 9/0877 (2013.01); G06F 21/72 (2013.01)

(58) Field of Classification Search
CPC .............................. H04L 9/0877; G06F 21/72
See application file for complete search history.

(56) References Cited

U.S. PATENT DOCUMENTS

| | | | | |
|---|---|---|---|---|
| 11,475,140 B1 * | 10/2022 | Buonora | ............... | G06F 21/602 |
| 2016/0028551 A1 * | 1/2016 | Hussain | .................. | H04L 63/06 |
| | | | | 713/156 |
| 2019/0034357 A1 * | 1/2019 | Nunez Mencias | .. | G06F 12/1408 |
| 2022/0067221 A1 * | 3/2022 | Schiattarella | ........... | H04L 9/088 |
| 2025/0192999 A1 * | 6/2025 | Kumar | .................. | H04L 9/0897 |
| 2025/0245032 A1 * | 7/2025 | Couture | .............. | G06F 9/45558 |

* cited by examiner

*Primary Examiner* — Hany S. Gadalla

(57) ABSTRACT

Provided is an electronic hardware sub-system within a multi-tenant Hardware Security Module (HSM) for tamper response against physical and logical attacks against the HSM. An HSM Manager manages and orchestrates the vHSMs for dynamic fraud analysis by way of a Tamper Prevention System, wherein a Watchdog detects intrusions and declares Tamper Events, and a Tamper Enforcement Module signals HSM Actors about a tamper state action responsive to said Tamper Event and intrusions. Once enabled, it protects multi-tenant applications against cryptographic attacks and offers continuous fraud detection in a layered approach that intelligently detects a root cause of an attack and isolated an impacted area in a tenant partition. Other embodiments disclosed.

14 Claims, 8 Drawing Sheets

| Tamper Event | Use-Case / Workflow | Tamper State Action |
|---|---|---|
| Hard tamper system level | Anomalies detected from 3.7, 3.8 path | Clear keys and shutdown the system for all tenants |
| Soft tamper system level | Anomalies detected by Sensor Processor 3.5, 3.6 path | Tenants' keys are intact, root key are deleted |
| Hard tamper tenant level | Anomalies detected in tenant path that has not been detected at early stages and call has reached OS /HW | Tenants' keys (vHSM root keys) are deleted, system root keys are not deleted and vHSM instance is shutdown for that tenant and soft tamper to other tenants |
| Soft tamper tenant level | Anomalies detected at the network level from 3.1- 3.4 paths | Only crypto ops are halted for that tenant and alert is sent and HSM need re-commission to becomes fully operational again |
| | | |

| Path | Actors Involved | Actions |
|------|-----------------|---------|
| 1.1 | Application (201) | Calling crypto API over TCP/UDP/HTTP(s) for crypto ops |
|  | Administrator (202) | Calling management API over TCP/UDP/HTTP(s) for asset management |
| 1.2 | Crypto API Server (120) to Virtualization Layer (130) | To perform cryptographic ops starting from Crypto API Server<br>To perform management ops starting from HSM manager |
|  | Data storage (121) to Tenant keys (131) | To store tenant keys in storage |
| 1.3 | Virtualization Layer (130) to HSM Manager (60) | The virtualization layer is managed by HSM Manager acting on behalf of platform |
| 1.4 | HSM Manager (60) to Embedded OS (57) | To use underlying Host OS to run software stacks |
| 1.5 | Embedded OS (57) to Physical Comp Resources (58) | Abnormal activities: overheating, abrupt movements, physical intrusion, excess power consumption, overactive threads or processes,memory access |
| 2.0 | Sensor Processor (52) to Hardware Sensors | The processor retrieves: overheating, actual sensor to identify the delta change in voltage, gyrometer, physical cover, etc. |

Layers →

| Path | HSM Actors Involved | Action |
|---|---|---|
| 3.1(Host detection) | Tenant Crypto API service (120) | Monitoring the access of privileged data such as "Keys" stored in secure file system via crypto service |
| 3.2(Host detection) | Tenant Crypto Database (121) | Monitoring syscalls for crypto ops to virtualization layer and keeping note of calls and its metrics ( # of syscalls etc ) |
| 3.3(Host detection) | Crypto Keys (131) | Monitoring keys usage through HSM manager adhering to tenant isolation boundaries |
| 3.4(Host detection) | Virtualization Layer(120) | Monitoring virtualization engine's HSM manager resource to ensure that VSM layer does not becomes single point of failure |
| 3.5(Host detection) | HSM Manager (60) | Monitoring syscalls for HSM manager to create tenant executable processes and root keys usage of each tenant |
| 3.6(Host detection) | Operating System (58) + (Kernel & drivers) | Monitoring of the HSM kernel drivers utilizing underlying sensitive h/w resources like entropy generator chip, crypto accelerator chip and other peripheral devices. |
| 3.7(Host detection) | Sensor Processor (51) | Monitoring the tamper sensor bus connectivity to ensure data can be retrieved and not bus is not tampered failing to provide sensor data |
| 3.9(Host detection) | Data packets of Application (201) ( all tenants; all vHSMs ) | Monitoring TCP packets containing sensitive information such as PIN/CVV/Keys etc adhering to configured access mgmt rules and identifying OWASP vulnerability |
| 3.8(Host detection) | HSM Mgmt Interface of Admin (202) | Monitoring TCP packet for administrative calls identifying OWASP attack signature |

Watchdog Observabilities

| Path | HSM Actors Involved | Action |
|---|---|---|
| 4.0 | Watchdog (60)<br>Tamper Enforcement Module (TEM) (72) | In the event of intrusion being detected from tracing of syscalls, data packets, crypto Assets in 3.1 to 3.9, An Alert Signal is sent to TE Module with all details.<br><br>The TEM will classify the threat and will act accordingly.<br><br>The metrics are collected over a period and compared with pre-defined stored data to determine if an intrusion such as DDOS is happening etc ( static rulesets)<br><br>Another validation could be comparing the # of external calls with # of internal syscalls if the execution path has anomaly (dynamic rulesets) |
| 4.1 | TEM (72), Tenant Crypto Service (120), Tenant Asset Service | Once an anomaly is detected and the steps where the anomaly was detected it will be classified as Tenant specific vs system-wide |
| 4.2 | TEM (72), HSM Manager (60) | Anomaly detected for particular tenants are send to the manager to block tenant key usage and/or stop crypto service virtualized instances |
| 4.3 | TEM (72), Operating System (58) | Anomaly detected at system level is sent to the Platform HSM board to lock all ongoing operations on the particular Hardware and alert HSM service owner. This then initiates a safe mode start sequence of the compete HSM. |

TAMPER RESPONSE AGAINST PHYSICAL AND LOGICAL ATTACKS ON AN HSM

TECHNICAL FIELD

The present invention relates generally to cryptographic devices, and more particularly, to improving tamper prevention performance of Hardware Server Module (HSM) against physical and logical attacks in a multi-tenant crypto provider service environment.

BACKGROUND

A Hardware Server Module (HSM) serves as a trust anchor to create hardened, tamper-resistant environments for storing cryptographic keys. Traditionally, a hardware security module includes one or more secure crypto-processor chips and usually exists as an external device or plug-in card that attaches directly to a network server or computer. These devices generally perform two types of functions: storage of cryptographic objects such as asymmetric keys, symmetric keys and X509 certificates, and performing cryptographic operations, for example, asymmetric key pair generation, symmetric key generation, hashing, encryption/decryption and signing.

A payment Hardware Server Module (HSM) is a hardened, tamper-resistant hardware device that is used primarily by the retail banking industry to provide high levels of protection for cryptographic keys and customer PINs used during the issuance of magnetic stripe and EMV chip cards (and their mobile application equivalents) and the subsequent processing of credit and debit card payment transactions. Payment HSMs normally provide native cryptographic support for all the major card scheme payment applications and undergo rigorous independent hardware certification.

Credit and debit card PIN fraud is a persistent problem in payments industry. Moreover, in a Hardware-as-a-Service model where a single HSM is shared by multiple customers, supporting and protecting multi-tenant applications against cryptographic attacks is highly complex and thus problematic in offering continuous fraud detection on a same HSM. This complexity increases more where the tamper conditions in the HSM needs to be intelligently detected and isolated sufficiently well to diagnose the root cause and isolate the impacted area of an attack.

SUMMARY

A need exists for improved performance management of multi-tenant HSMs and to address intrusion prevention from attacks against crypto services, cryptographic keys and card payments sensitive material such as PINs, CVCs. This same need applies to crypto applications on a general purpose HSM.

In some embodiments an electronic hardware sub-system within a multi-tenant Hardware Security Module (HSM) (10) suitable for use for tamper response against physical and logical attacks against the HSM is provided. The electronic hardware sub-system comprises a Main Processor (MP) (50) running an operating system (OS) that produces virtualized HSM instances (vHSMs) (61/62) per tenant using virtualization technologies that are one among containers or micro Virtual Machines (uVMs) running crypto services logic; a Sensor Processor (SP) (51) communicatively coupled to said MP over a PCIe communication channel to provide tamper handling against physical and logical attacks of said virtualized HSM instances (61/62) on said HSM; and an HSM Manager (60) executing in said MP to manage and orchestrate said vHSMs (61/62) for dynamic fraud analysis by way of a Tamper Prevention System (70) on the HSM, and communicatively coupled to crypto client applications (82) operating as tenants and sending API (13) commands to said multi-tenant HSM, detect any kind of intrusions that happen at an actual tenant level of crypto API services (120) offered by the HSM to them, and then, identify, and separate out, affected API services of a particular tenant to isolate physical and logical attacks against other tenants. The MP (50) and SP (51) are distinct hardware devices that each can include one or more Central Processing Units (CPUs) and memory coupled to the one or more CPUs where the memory includes computer instructions which when executed by the one or more processors causes the one or more processors to perform the operations related to fraud analysis, threat detection, and tamper management.

In some embodiments of the electronic hardware sub-system, the HSM Manager (60) provides a Hardware as a Service (HaaS) to said crypto client applications (82) for each vHSM tenant (61/62) by way of a Crypto API Service (120) to both: tenant users along a crypto services path in a Virtual Private Network (VPN) connection to the HSM; and tenant administrators along an administrative operations path in said VPN connection to the HSM wherein said actual tenant level comprise data, access controls, security policies, and separate administration access assigned to a particular tenant vHSM.

In some embodiments of the electronic hardware sub-system, the HSM Manager (60) processes and responds to API (13) commands said crypto client applications (82) over a TCP/TLS connection per tenant for satisfying cryptographic service requests.

In some embodiments of the Tamper Prevention System (70) comprises a Physical Sensor process including voltage sensors, physical sensors, gryroscopic sensors and temperature sensors communicatively coupled to and controlled by said SP (51); and a Logical Sensor process including security controls, network security, behavioral security, and intrusion detection rules communicatively coupled to and controlled by said MP (50).

In some embodiments of electronic hardware sub-system, the Logical Sensor process implements an Extended Berkeley Packet Filter (eBPF) in a Linux Operating System on the MP (50) for fraud analysis observability and tracing to detect fraud in a Multi-Tenant configuration of the HSM (10).

In some embodiments of the electronic hardware sub-system, the Tamper Prevention System (70) further comprises: a Watchdog (71) for detecting intrusions and declaring a Tamper Event (300); and a Tamper Enforcement Module (72) to signal HSM Actors about a tamper state action responsive to said Tamper Event and intrusions, wherein said Tamper Prevention System (70) runs on a separate hardware running its own kernel than said HSM (10).

In some embodiments of the electronic hardware sub-system, the Tamper Event m (300) consist of: a hard tamper system level to clear keys and shutdown the HSM for all tenants; a soft tamper system level to delete root keys but preserve Tenants' keys intact; a hard tamper tenant level to shutdown particular tenants and initiate soft tamper actions on other tenants; and a soft tamper tenant level to halt only crypto operations for a detected tenant of a respective vHSM (61/62) and send an alert to the HSM (10) to re-commission to become fully operational again. In some embodiments of the electronic hardware sub-system of claim 7, the Tamper Enforcement Module (72) generates a continuous tamper event matrix to identify threats and associated severities to determine an appropriate response to said Tamper Event, wherein Tamper Enforcement Module (72) sends signals to individual vHSMs (61/62) and underlying virtualized infrastructure, upon appropriate tamper event detection to stop processing crypto functions.

In some embodiments of the electronic hardware subsystem, the HSM Actors comprise: a crypto client (82) application for calling crypto API (13) over TCP/UDP/HTTP(s) for crypto operations on said HSM (10); and an administrator for management API (13) over TCP/UDP/HTTP(s) for asset management of said HSM (10). In some embodiments of the electronic hardware sub-system of claim 6, wherein said HSM Actors comprise: a Crypto API Service (120) providing a virtualization layer (130) to perform cryptographic operations starting from said HSM Manager (60); and a Data Storage (121) for holding tenant keys (131) to perform management operations starting from said HSM Manager (60), wherein said virtualization layer (130) is managed by the HSM Manager (60) acting on behalf of a platform operator.

In some embodiments of the electronic hardware sub-system the Watchdog (71): monitors calls to said Crypto API Service 120 within an operating system layer to identify system call behaviors; monitors traffic from a caller to a callee function for said system calls at other layers, and identifies if that system call behavior is normal or an anomaly for said system calls.

In some embodiments a method suitable with an electronic hardware sub-system within a multi-tenant Hardware Security Module (HSM) (10) for tamper response against physical and logical attacks against the HSM is provided. The method includes, by way of a Main Processor (MP) (50), running an operating system (OS) that produces virtualized HSM instances (vHSMs) (61/62) per tenant using virtualization technologies that are one among containers or micro Virtual Machines (uVMs) running crypto services logic; by way of a Sensor Processor (SP) (51) communicatively coupled to said MP over a PCIe communication channel, providing tamper handling against physical and logical attacks of said virtualized HSM instances (61/62) on said HSM; and by way of an HSM Manager (60) executing on said MP, managing and orchestrating said vHSMs (61/62) for dynamic fraud analysis by way of a Tamper Prevention System (70) on the HSM, and communicatively coupled to crypto client applications (82) operating as tenants and sending crypto API (13) commands to said multi-tenant HSM, detecting intrusions that happen at an actual tenant level of crypto API services (120) offered by the HSM to them, and then, identifying, and separating out, affected API services of a particular tenant to isolate physical and logical attacks against other tenants.

In some embodiments the method further comprises, by way of a Watchdog (71), detecting intrusions and declaring a Tamper Event (300); and by way of a Tamper Enforcement Module (72), signaling HSM Actors about a tamper state action responsive to said Tamper Event and intrusions, wherein said Tamper Prevention System (70) comprises said Watchdog (71) and Tamper Enforcement Module (72) that run on a separate hardware running its own kernel than said HSM (10).

In some embodiments the method comprises clearing keys and shutting down the HSM for all tenants responsive to a hard tamper system level, deleting root keys while preserving Tenants' keys intact responsive to a soft tamper system level; shutting down particular tenants and initiating soft tamper actions on other tenants responsive to a hard tamper tenant level; and halting only crypto operations for a detected tenant of a respective vHSM (61/62) and sending an alert to the HSM (10) to re-commission to become fully operational again responsive to a soft tamper tenant level.

BRIEF DESCRIPTION OF THE DRAWINGS

The accompanying drawings, which are incorporated in and constitute a part of this description, illustrate embodiments consistent with the invention and, together with the description, serve to explain the principles of the invention.

FIG. 3A illustrates a table of Tamper Events and corresponding Tamper State Actions responsive to certain use-case and workflow scenarios in accordance with some embodiments;

FIG. 3B illustrates a table showing the HSM Actors involved at the various layers associated with each path and their exemplary actions in accordance with some embodiments;

FIG. 3C illustrates a table showing the watchdog oversight of HSM Actors involved at the various layers associated with each path of watchdog observability and the exemplary actions in accordance with some embodiments;

FIG. 3D illustrates a table showing resulting tamper actions of the Tamper Response System 70 at various paths over the various layers responsive to intrusion or threat detections in accordance with some embodiments.

Specific embodiments in this invention have been shown by way of example in the foregoing drawings and are hereinafter described in detail. The figures and written description are not intended to limit the scope of the inventive concepts in any manner.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
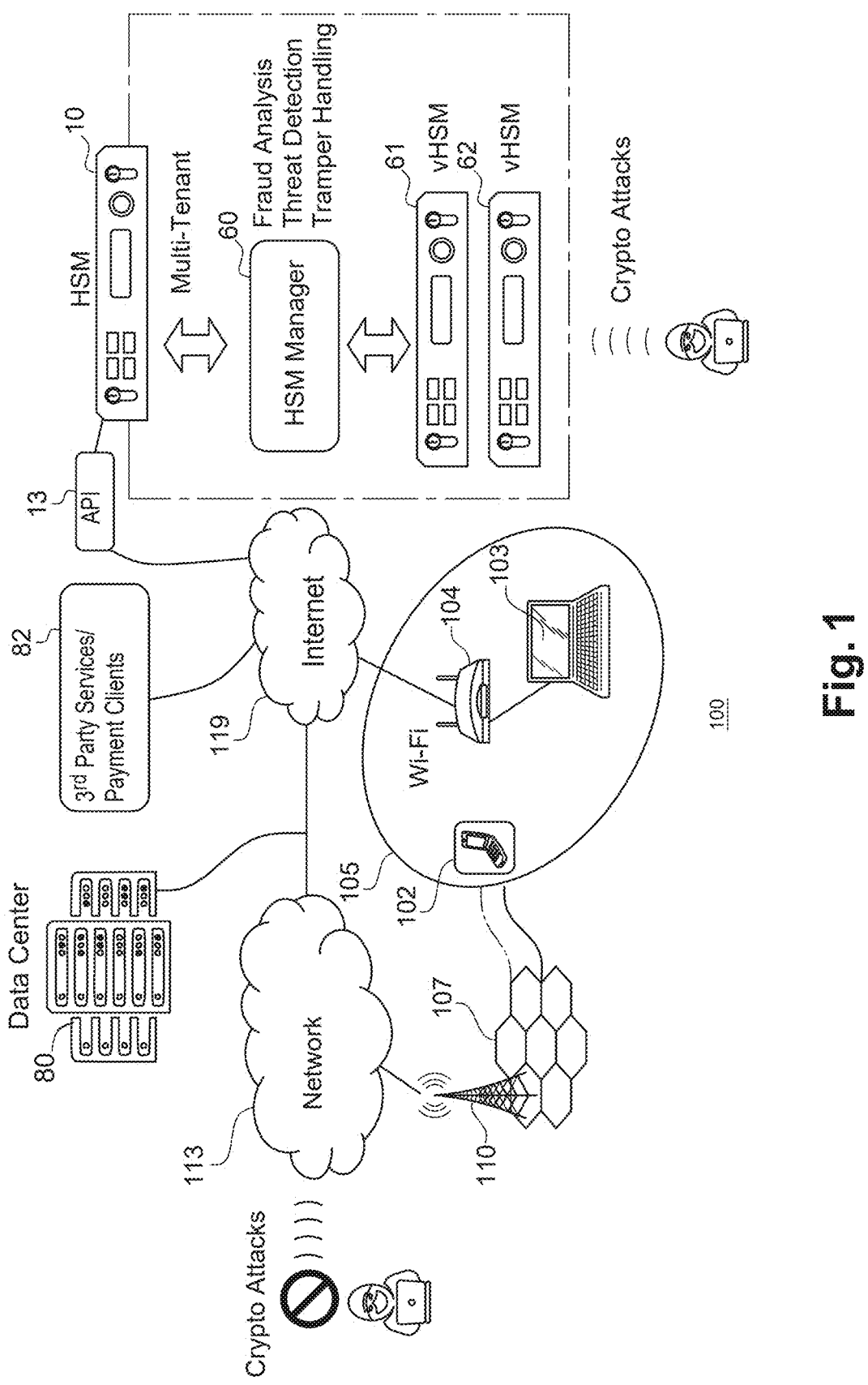
FIG. 1 depicts an exemplary communication environment for configuring and operating a next generation Hardware Server Module (HSM)

FIG. 1 depicts an exemplary communication environment 100 for configuring and operating a next generation HSM 10. In the context of the present description, an HSM is a hardened, tamper-resistant hardware device that secure cryptographic processes by generating, protecting, and managing keys used for encrypting and decrypting data and creating digital signatures and certificates. It is a tamper and intrusion-resistant, highly-trusted physical device whose primary purpose is to conceal and protect cryptographic data and prevent compromise of private keys and customer PIN used on the data responsive to attacks, which are generally classified in two categories; hardware and software attacks. If a security breach due to an attack is detected, a tamper event occurs and the HSM becomes locked until the tamper is cleared by the appropriate authority, or the HSM is reset.

In other arrangements, the HSM 10 may be deployed in a Hardware-as-a-Service model (HaaS) where it is shared by multiple customers, for instance, supported by 3$^{rd}$ party services providing crypto client applications 82 that run on the HSM via an Applications Programming Interface (API) 13 to process cryptographic commands thereon. It may also form part of an HSM cluster managed by a single server application used by various services and applications. These cloud-based and network-attached HSMs can be used by a large number of clients/tenants and thus need to have the capability of allowing for multi-tenancy. Accordingly, in a Hardware-as-a-Service model where a single device is shared by multiple customers, a proper partitioned system under direction of the HSM Manager 60 provides high complexity in continuous fraud detection. As described ahead, it is sufficiently intelligent in these complex situations to diagnose a partition area of the root cause and isolate the impacted area of the partition.

In some arrangement the crypto client application 82 is a payment client application communicating with a payments HSM over a payments based API 13; specific for payments commands. Briefly, a "payments HSM" is an HSM for use in financial payments or banking industry. In this manner, it provides attack detection and prevention against cryptographic keys or card payments sensitive material such as PINs, CVCs. It may also be a "hosted HSM" physically hosted by a computing service provider. It may also operate as a "cloud HSM" to provide same functionality as on-premises HSMs with the benefits of a cloud service deployment, without the need to host and maintain on premises appliances. The HSM 10 may also reside in a networked data center 80 for providing cloud HSM services via the one or more Payments vHSM instances. A typical HSM deployment can provide for Software as a Service (SaaS), Platform as a Service (PaaS), or Infrastructure as a Service (IaaS) models. In this environment, the HSM Manager 60 provides local and remote management features tailored to the HSM 10. Among other functions, it allows for remote HSM operation and administration through a standard browser interface. By utilizing smart card access control, secure connections with HSMs can be established.

The HSM Manager 60 is also responsible for instantiating one or more virtual HSMs (61/62). The HSM 10 is designed to support these virtualized HSM instances using virtualization technologies such as containers or micro VMs. The HSM Manager 60 service via API 13 can serve to configure, manage and orchestrate these virtual HSM instances 61/62 on the HSM 10. In some arrangements, the virtualized HSM instance 61/62 is a virtual HSM (vHSM) service running payments services logic, and can each be referred to as a "Payments vHSM" instance. In these cases, by way of the HSM Manager services 60, each "Payments vHSM" instance is provided with a necessary master key and settings (security, PIN fraud, etc.) and necessary certificates (e.g. 509) for secure communications. For example, crypto client applications 82 can send payment commands via API 13 to the desired "Payments vHSM" instances 61/62 over TCP/TLS connections directly or via 3$^{rd}$ party services. These Virtualized payments HSM instance are individually configured to allow the ability for dynamic fraud analysis, for example, responsive to a crypto attack, whether physical or logical, against the HSM 10 when operating as a multi tenant crypto provider service, for example, under an HaaS model.

The communication environment 100 can include a telecommunication network 113 and an internet communication network (Internet) 120. The telecommunication network 113 can provide a mobile communication link via base receiver 110 for wireless connectivity of a mobile device 102 from one or more cells 107. In one arrangement, the mobile device 102 can communicate over a Radio Frequency (RF) link with the base receiver 110 using a standard communication protocol such as legacy 2G (CDMA, GSM) and 3G, or LTE 4G and 5G. The base receiver 110, in turn, can connect the mobile device 102 to the Internet 120 over a packet switched link. The internet can support application services and application service layers for providing media or content to the mobile device 102. By way of the communication environment 100, the mobile device 102 can establish connections with a server/service 82 on the network and with other mobile devices for exchanging information or providing services such as audio, text messaging, media, audio, video, interactive applications, and the like. The server can have access to a database that is stored locally or remotely and which can contain profile data. The server can also host application services directly, or over the Internet 119.

The mobile device 102 can also connect to the Internet over a Wi-Fi or WLAN 105. Wireless Local Access Networks (WLANs) provide wireless access to the mobile communication environment within a local geographical area. WLANs can also complement loading on a cellular system, so as to increase capacity. Wi-Fi is the wireless technology used to connect computers, tablets, smartphones and other devices to the internet. Wi-Fi is the radio signal sent from a wireless router to a nearby device, which translates the signal into data for the user of the mobile device 102. Wi-Fi is a family of wireless network protocols, based on the IEEE 802.11 family of standards, which are commonly used for local area networking of devices. WLANs are typically composed of a cluster of Access Points (APs) 104 also known as base stations. The mobile communication device 102 can communicate with other WLAN stations such as a laptop 103 within the base station area 105. In typical WLAN implementations, the physical layer uses a variety of technologies such as IEEE 802.11 technologies. The physical layer may use infrared, frequency hopping spread spectrum in the 2.4 GHz or 5 GHz Band, or sequence spread spectrum. The mobile device 102 can send and receive data to a server or other remote servers on the mobile communication environment. In one example, the mobile device 102 can send and receive audio, video, or other multimedia content from the database through the server 130.

Figure 2A:
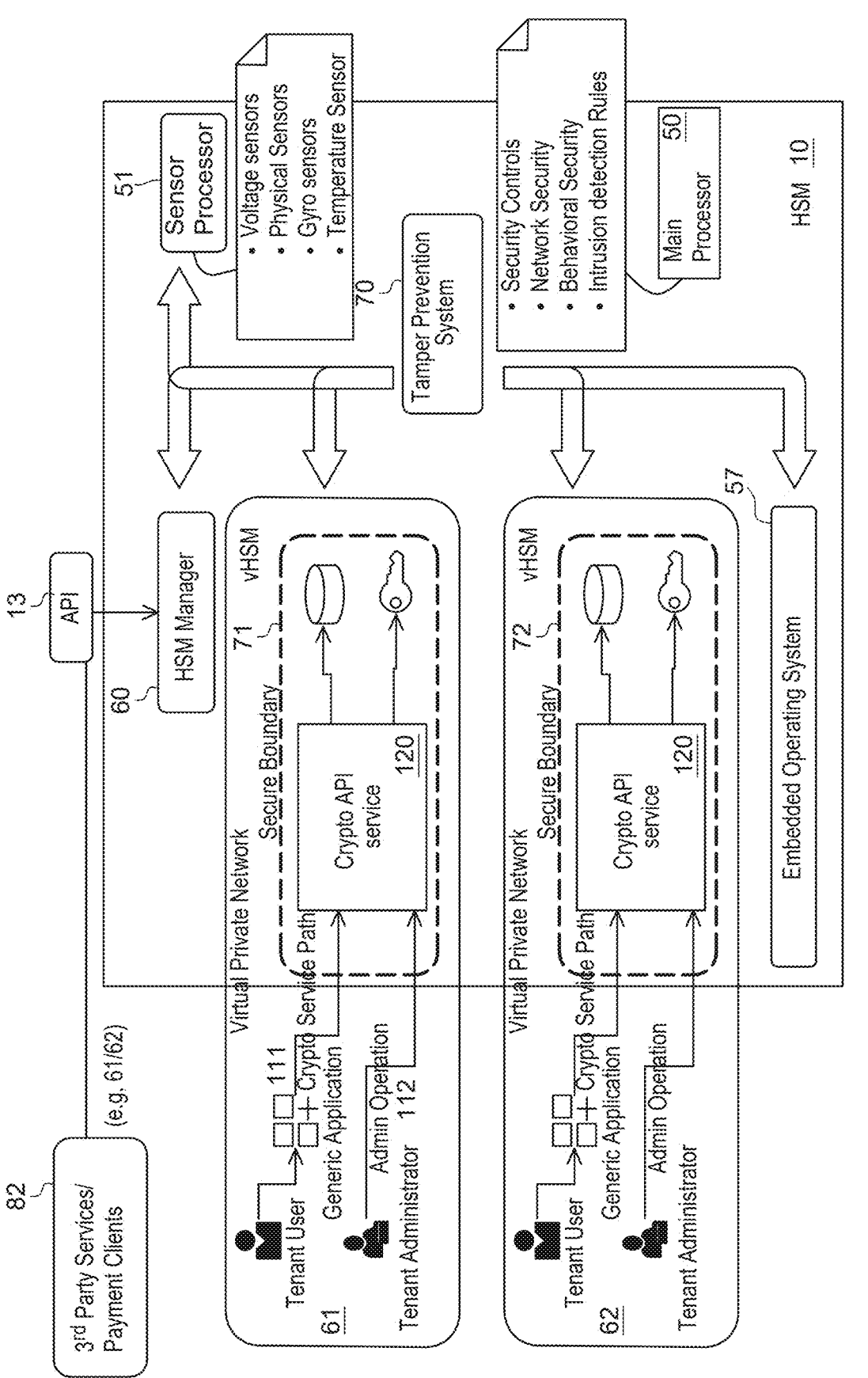
FIG. 2A illustrates HSM components relevant to tamper response handling against physical and logical attacks of a multi-tenant architecture in accordance with some embodiments.

Referring to FIG. 2A a more detailed view 200 of HSM components relevant to tamper response handling against physical and logical attacks in a multi-tenant architecture is shown. Here, the HSM 10 comprises physical hardware components of a Main Processor (MP) 50 and a Sensor Processor (SP) 51, each of which are distinct hardware devices that each can include one or more Central Processing Units (CPUs) and memory coupled to the one or more CPUs where the memory includes computer instructions which when executed by the one or more processors causes the one or more processors to perform the operations related to fraud analysis, threat detection, and tamper management. Here, the HSM components comprise an electronic hardware sub-system within a multi-tenant Hardware Security Module (HSM) 10 suitable for use for tamper response against physical and logical attacks.

The electronic hardware sub-system comprises the Main Processor (MP) 50, the Sensor Processor (SP) 51, the HSM Manager 60 and the Tamper Prevention System 70. In some arrangements, the MP 50 is a System on a Chip (SoC) that includes a dedicated crypto-processor serving a dedicated software cryptographic accelerator. In some other HSMs, an entirely separate hardware crypto-processor, for example, connected via PCIe to the MP, for performing hardware accelerated cryptographic commands. The MP 50 runs an operating system (OS) that produces virtualized HSM instances (vHSMs) 61/62 per tenant using virtualization technologies that are one among containers or micro Virtual Machines (uVMs) running crypto services logic. The Sensor Processor (SP) 51 is communicatively coupled to the MP to provide tamper handling against physical and logical attacks of the virtualized HSM instances 61/62 on the HSM 10. The Tamper Prevention System 70 requests/receives communications from the MP 50 and SP 51 related to tamper events. The HSM Manager 60 is communicatively coupled to the SP 51 and MP 50 to manage and orchestrate the vHSMs 61/62, and for dynamic fraud analysis by way of the Tamper Prevention System 70 that is communicatively coupled to crypto client applications 82 operating as tenants and sending API 13 commands to the multi-tenant vHSMs.

The Tamper Prevention System 70 is communicatively coupled to the SP 51, MP 50, HSM Manager 60, and Embedded OS 57 and includes software components executing on the hardware. This ensures physical security as well as the logical security of the HSM remains intact during use. To this point, the Tamper Prevention System 70 comprises a Physical Sensor process communicatively coupled to and controlled by the SP 51, and a Logical Sensor process communicatively coupled to and controlled by the MP 50. The Physical Sensor process includes voltage sensors, physical sensors, gyroscopic sensors, and temperature sensors, for example, to detect one of power, movement, temperature, or other sensory event on or within the HSM 10. The sensors ensure that the physical security is intact, with an additional focus on the security controls and the network security without acting as a proxy. The Logical Sensor process includes security controls, network security, behavioral security, and intrusion detection rules, which will identify logical crypto attacks based on tamper states. In some configurations, the Logical Sensor process implements an Extended Berkeley Packet Filter (eBPF) in a Linux Operating System on the MP 50 for fraud analysis observability and tracing to detect fraud in a Multi-Tenant configuration of the HSM (10).

The HSM Manager 60 can execute on the embedded operating system (OS) running on the Main Processor 50, and is communicatively coupled to the Sensor Processor 51 over a communications interface, for example, PCIe, SPI or UART. The HSM Manager 60 can also process and respond to API 13 commands from the crypto client applications 82 over a TCP/TLS connection per tenant for satisfying cryptographic service requests. As illustrated, the HSM Manager 60 can instantiate and manage multi-tentants, including, but not limited to, vHSM 60 and vHSM 61. Each vHSM 60/61 provides a security boundary 71/72 as per FIPS compliance and PCI compliance that dictates the physical security requirement for the HSM. In a payments HSM, this secure boundary 71/72 allows for safely storing the security of the cryptographic keys as well as PINs and CVVs that are generated for payment transactions done within the HSM. Here, the Tamper Prevention System 70 protects the keys and the PINs for each vHSM in this multi tenant environment of the HSM within the respective security boundaries 71/72 by additionally acting as an intrusion protection system to detect not just physical security, but also logical security.

To this point, the created HSM partitions are independent logical HSMs that reside within the HSM each within their own security boundary 71/72. Each HSM Partition is available as a separate tenant that has its own data, access controls, security policies, and separate administration access, referred herein as actual tenant levels assigned to a particular vHSM. Crypto client applications 82 may be assigned to vHSM partitions that once connected are referenced as a numbered slot. Accordingly, multi-tenant applications interface with multiple HSM partitions. This means that each tenant has its own security boundary 71/72, but at the same time it is running in the HSM 10 on the MP 50. Each customer, or tenant, by way of the HSM Manager 60, is provided their own instance for Crypto API Service 120, which is basically within the virtual private network of the of the customer, and is essentially issued to, and belongs to, the customer tenant. The 3$^{rd}$ Party Service Provider basically manages the tenants, but it is up to the tenant to manage their keys that are there within their crypto API service 120. This is also why the Tamper Prevention System 70 is running within the HSM but on a separate processor (e.g. MP 50 and/or SP 51); that is, in order to identify attacks that happen on the virtualized environments of each vHSM, including, but not limited to, communications over a Virtual Private Network between the multiple tenants and the Crypto API Service 120, or other monitoring and management programs. It may also run on a separate hardware running its own kernel (e.g., security-enhanced Linux; SELinux) than HSM (10). It can detect any kind of intrusions that happen at an actual tenant level for their crypto API services 120 offered by the HSM to them, and then identify, and separate out, the affected API service of the particular tenant of a particular tenant to isolate physical and logical attacks against other tenants.

As one example, the HSM Manager 60 provides a Hardware as a Service (HaaS) to crypto client applications 82 for each vHSM tenant 61/62 by way of the Crypto API Service 120 over the VPN connections between the multiple tenants. This allows tenant users in their vHSM to execute crypto commands on the HSM along a crypto services path 111 in a Virtual Private Network (VPN) connection to the HSM; and also, simultaneously, tenant administrators along an administrative operations path 112 in their VPN connection to the HSM. In this architecture the Tamper Prevention System 70 communicates with the vHSMs 61/62 and respective processors 50/51 in a timely manner requiring maintaining numerous communication sessions, where on-demand creation of such sessions is otherwise 'costly'. It creates and manages these sessions, including handling multiple error scenarios and recovery, which otherwise would pose serious challenges around HSM management on a single hardware processor (e.g. MP 50) to ensure tenant isolation and resiliency; challenges otherwise compounded by latency and throughput requirements.

Figure 2B:
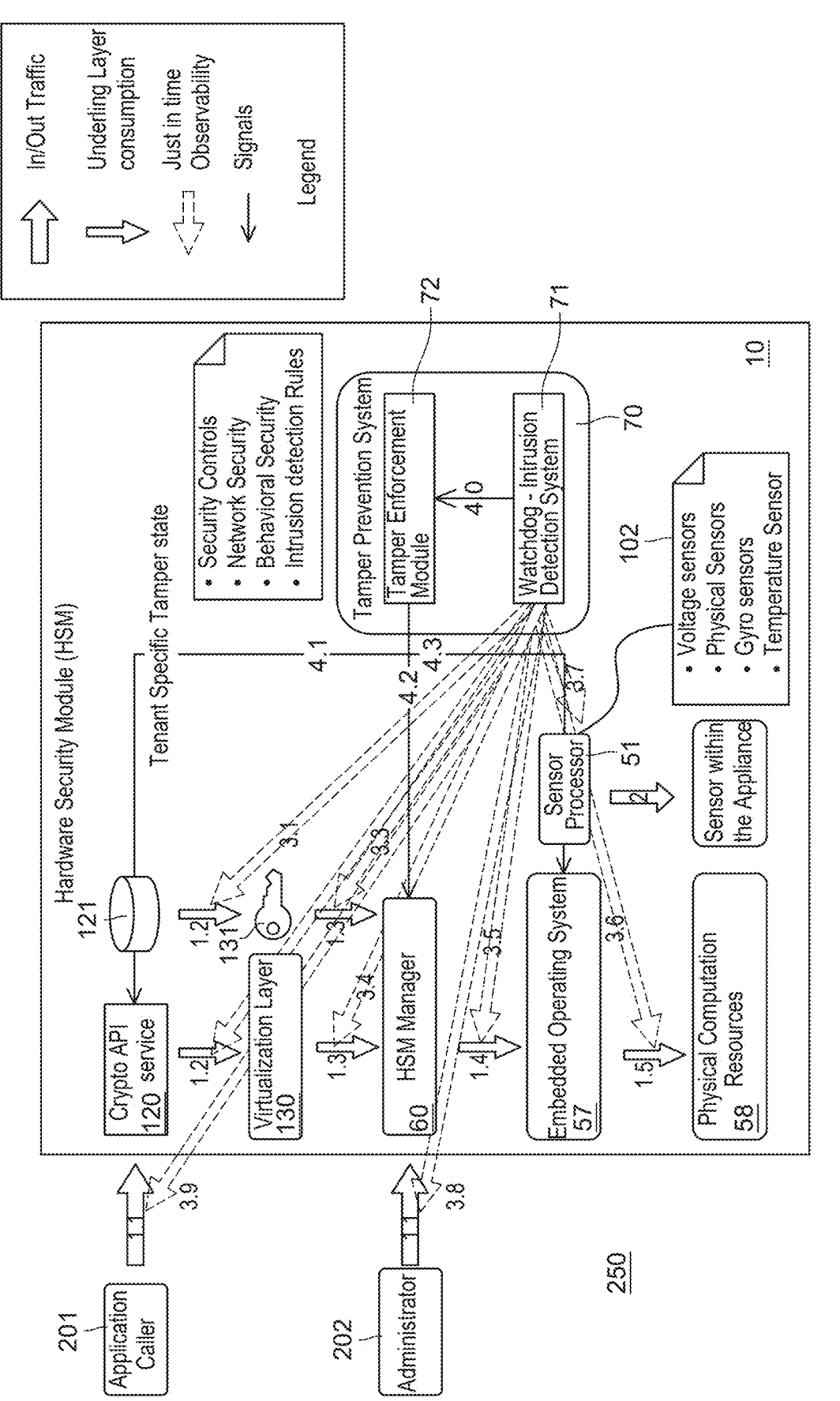
FIG. 2B illustrates various levels of tamper response workflows against physical and logical cryptographic attacks on the HSM when operating in a multi-tenant configuration in accordance with some embodiments.

Referring to FIG. 2B, a diagram 250 illustrates various levels of tamper response workflows against physical and logical cryptographic attacks on the HSM when operating in a multi-tenant configuration. In charge of overseeing and evaluating these workflows is the Tamper Prevention System 70 which comprises a Watchdog 71 for intrusion detection and declaration of tamper events, and a Tamper Enforcement Module 72 for handling tamper state actions responsive to the tamper events. Tamper events may arrive from the physical process (e.g. voltage sensors, physical sensors, gyro, temperature, etc.) or the logical process (e.g. security controls, network security, behavioral security, etc.) previously described. In particular, the Tamper Enforcement Module 72 signals specific HSM Actors about a tamper state action responsive to a Tamper Event, for example, from intrusions detected from the Watchdog 71. In some arrangements, an HSM Actor may be a payments client application (requesting crypto services), a user of the application, a remote management system, an administrator of that system, or other software module described herein (e.g., HSM Manager 60, Watchdog 71, Virtualization Layer 130, etc.). For example, the HSM Actor can be crypto client 82 application for calling crypto API 13 over TCP/UDP/HTTP(s) for crypto operations on the HSM 10, or an administrator for management API 13 over TCP/UDP/HTTP(s) for asset management of the HSM 10.

The Watchdog 71 continually assesses the workflow paths amongst the HSM Actors and also related to any of the physical processes and logical processes, ingress/egress of data traffic, and assigns a tamper event when conditions are identified. The workflow paths are enumerated (1, 2, 3 to 4) from top level to low level with respect to actions of an external user, tenant or administrator or their applications or programs interacting with the HSM 10 as their crypto request and commands traverse layers of the HSM down to the secure crypto processing units assigned to each vHSM. This includes external workflows (related to network detection events) and internal workflows (related to host detection events). As one example, the Crypto API service 120 will use the virtualization layer 130 which it will use the HSM manager that is running in the operating system within HSM using the physical resources like CPUs or crypto accelerators or GPUs that are built within the HSM, which constitutes one layer. There are multiple layers as shown by HSM Manager 60, Watchdog 71, Virtualization Layer 130, embedded OS 57, or hardware/physical component (e.g. Crypto API server, MP, SP, OS, etc.).

The Watchdog 71 continually evaluates external workflow 1.1 initiated by an Application Caller 201 (e.g. a tenant of a vHSM issuing crypto API 13 commands by way of a crypto client Application) over Just In Time (JIT) observability denoted by path 3.9. Here, the Watchdog is an HSM Actor that monitors TCP packets (or data packets of tenants) containing sensitive information such as PIN/CVV/Keys etc adhering to configured access management rules and identifying OWASP vulnerability. Similarly, the Watchdog 71 continually evaluates external workflow 1.1 initiated by an Administrator 202 (e.g. service provider monitoring the HSM remotely) over Just In Time (JIT) observability denoted by path 3.8. Here, the Watchdog monitors TCP packet for administrative calls over an HSM Management interface for identifying OWASP attack signature. Here, the HSM Actors include the Crypto API Service 120 providing a virtualization layer 130 to perform cryptographic operations starting from the HSM Manager 60; and a Data Storage 121 for holding tenant keys 131 to perform management operations starting from the HSM Manager 60. The virtualization layer 130 can be managed by the HSM Manager 60 acting on behalf of a platform operator.

The Watchdog 71 also continually evaluates internal workflows (e.g., 1.2, 1.3, 1.4, 1.5) across various HSM Actors (e.g., Crypto API Service 120, Virtualization Layer 130, HSM Manager 60, Embedded OS 57, and lower level physical computation resources 58) residing at various processing layers in the HSM with respect to crypto command handling order and priority. For example, Watchdog 71 evaluates paths 1.2, 1.3, 1.4, 1.5 by respective Just In Time (JIT) observabilities by paths 3.2. 3.4, 3.5, 3.6. Similarly, as more sensitive data or components are involved, Watchdog 71 evaluates lower-level resource use as complexity of crypto command processing increases, for example, access to data storage 121 and access (e.g. read, write, etc.) of private/public keys 131 over path 1.2 and 1.3 with respect to Just In Time (JIT) observabilities by paths 3.1 and 3.3. Notably, the Watchdog 71 monitors paths and activities down to the crypto units themselves within respective hardware secure processors (e.g., CPU, SRAM, SEC, Cache, Crypto HW accelerators, Public Key Hardware accelerators, etc.) similarly to tamper events.

Referring to FIG. 3A, a table 300 of Tamper Events and corresponding Tamper State Actions responsive to certain use-case and workflow scenarios is shown. The Watchdog 71 generates the Tamper Events, which include one among a hard tamper system level, a soft tamper system level, a hard tamper tenant level, and a soft tamper tenant level. The Tamper Enforcement Module 72 generates the Tamper State Actions. As shown in the table, responsive to a hard tamper system level it will clear keys and shutdown the system for all tenants; responsive to a soft tamper system level it deletes root keys while preserving intact tenants' keys; responsive to a hard tamper tenant level it shuts down particular tenants and issues soft tampers to other tenants as necessary; responsive to a soft tamper tenant level it halts only crypto operations for that tenant and sends an alert to HSM that it needs to re-commission, to becomes fully operational again. Notably, table 300 provides only a few examples of a tamper state action and others are contemplated, for example, code injection, SQL injection, cross-scripting, or code execution attacks.

In other examples, the Watchdog 71 monitors the crypto API service 120 calls within the within the operating system layer 57, for example, to identify system calls from that layer to another. Although it does not act as a proxy in this arrangement, it operates to observe the traffic from a caller to a callee function at other layers, and identify if that call behavior across layers is normal or if there's any anomaly in the call in. Once the watchdog identifies any anomaly of concern, or any unusual behavior that happens, it informs the tamper enforcement module 72 saying that there is a weird behavior. And based on that, it can activate the tamper of a particular tenant without affecting other tenants that are running in the same HSM 10. To this point the Tamper Enforcement Module 72 generates a continuous tamper event matrix to identify threats and associated severities with available tamper state actions to determine an appropriate response to reported Tamper Events, whereby it sends signals to individual vHSMs 61/62 and underlying virtualized infrastructure, upon appropriate tamper event detection to stop processing crypto functions. These signals can be software interrupts that notify a process that an event has occurred (e.g. on SP 51 or MP 50). These events might be requests from users or indications that a system problem, such as a memory access error, has occurred. Each signal can have a signal number and a default action defined.

FIG. 3B illustrates a table 310 showing the HSM Actors involved at the various layers associated with each path and their exemplary actions. For example, at path 1.1, Application 201 can call crypto API over TCP/UDP/HTTP(s) for crypto ops, and Administrator 202 can call management API 13 over TCP/UDP/HTTP(s) for asset management. At path 1.2, Crypto API service (server) 120 to Virtualization Layer (130) performs cryptographic operations starting from Crypto API Server 120; and, Data storage (121) to Tenant Keys (131) to store tenant keys in storage. At path 1.3, the virtualization layer 130 is managed by HSM Manager 60 acting on behalf of a platform operator 82. At path 1.4, HSM Manager 60 uses the underlying embedded Host OS 57 to run software stacks. At path 1.5, the Sensor Processor 51 retrieves sensory information (e.g., audio, visual, voltage, temperature; signals) from actual sensors capturing physical waveforms (e.g., sound, light, heat from EM) to identify the delta change (e.g. voltage, gyrometer, physical cover, etc.)

FIG. 3C illustrates a table 320 showing the watchdog oversight of HSM Actors involved at the various layers associated with each path of watchdog observability and the exemplary actions. Only representative and exemplary actions are provided for brevity. Understandably more actions are associated at each path may be performed. Along a first path 3.1, Watchdog oversees tenant Crypto API service 120, for example by monitoring the access of privileged data such as "Keys" stored in secure file system via crypto service. At path 3.2, Watchdog oversees Tenant Crypto Database 121, which can include monitoring system calls (syscalls) for crypto ops to virtualization layer and keeping note of the calls and associated metrics (#, type, severity, etc. of syscalls). At path 3.3, Watchdog oversees Crypto Keys 131 which can include monitoring keys usage through HSM manager adhering to tenant isolation boundaries. At path 3.4, Watchdog oversees Virtualization Layer 120 which can include monitoring virtualization engine's HSM manager resource to ensure that VSM layer does not becomes a single point of failure. At path 3.5, Watchdog oversees HSM Manager 60 which can include monitoring. At path 3.6, Watchdog oversees Operating System 58 with its Kernel & drivers, and Sensor Processor 51 which can include monitoring syscalls for HSM manager to create tenant executable processes and root keys usage of each tenant. At path 3.7, Watchdog oversees Data packets of Application 201, which includes all tenants of all vHSMs. Here, it monitors the HSM kernel drivers utilizing underlying sensitive hardware resources like entropy generator chip, random number generator, real-time clock, crypto accelerator chip and other peripheral devices. It also monitors the tamper sensor bus connectivity to ensure data can be retrieved and that the bus is not tampered thereby failing to provide sensor data. These paths are monitored with the HSM and referred to as host detection actions.

At path 3.8, Watchdog monitors data packets of all Applications 201 for all tenants across all active-use vHSMs. This includes inspection of TCP packets, for example, containing sensitive information such as PIN/CVV/Keys etc and then adhering to configured access management rules and identifying OWASP vulnerabilities. Along path 3.9, Watchdog oversees HSM management interfaces by Administrators (202), which includes monitoring TCP packet for administrative calls identifying OWASP attack signatures. The Open Web Application Security Project, or OWASP, is an international non-profit organization dedicated to web application security. Examples include injection attacks, broken authentication, fraudulent identity, sensitive data exposure, data breach, scripting attacks, broken access controls and so on. A security vulnerability on an HSM is a hole or a weakness internal/external to the HSM or anywhere along the connection path into the HSM, for example, via a crypto client application 82. Any of these may result from a design flaw or an implementation bug, which allows an attacker to cause harm to the stakeholders of an application.

FIG. 3D illustrates a table 330 showing resulting tamper actions of the Tamper Response System 70 at various paths over the various layers responsive to intrusion or threat detections. Only representative and exemplary actions are provided for brevity. Understandably more actions are associated at each path may be performed. Path 4.0 is between the Watchdog (60) and Tamper Enforcement Module (TEM) 72. In the event of an intrusion being detected from tracing of syscalls, data packets, and crypto Assets in 3.1 to 3.9, an alert signal is sent to TEM with all details. The TEM 72 will classify the threat and will act accordingly. It collects these metrices over a period and compared with pre-defined stored data to determine if an intrusion such as Distributed Denial of Service (DDOS) is occurring, etc. (e.g., using static rule sets). Another validation considers comparing a number of external calls with a number of internal syscalls to detect if the execution path for syscalls has anomaly (e.g., using dynamic rules sets).

At path 4.1, The TEM 72 assess whether an anomaly is detected and where along the other paths, and specific to, each layer (see Layers in FIG. 3B) the anomaly was detected, and then classifies the anomaly as Tennant-specific vs System-wide. In case of Tennant specific event. At path 4.2, The TEM 72 assesses whether an anomaly is detected for particular tenants are send to the manager to block tenant key usage and/or stop crypto service virtualized instances. At path 4.3, The TEM 72 assesses whether an anomaly is detected at system level is sent to to the Platform HSM board to lock all ongoing operations on the particular Hardware and alert HSM service owner. This then initiates a safe mode start sequence of the complete HSM.

Figure 4:
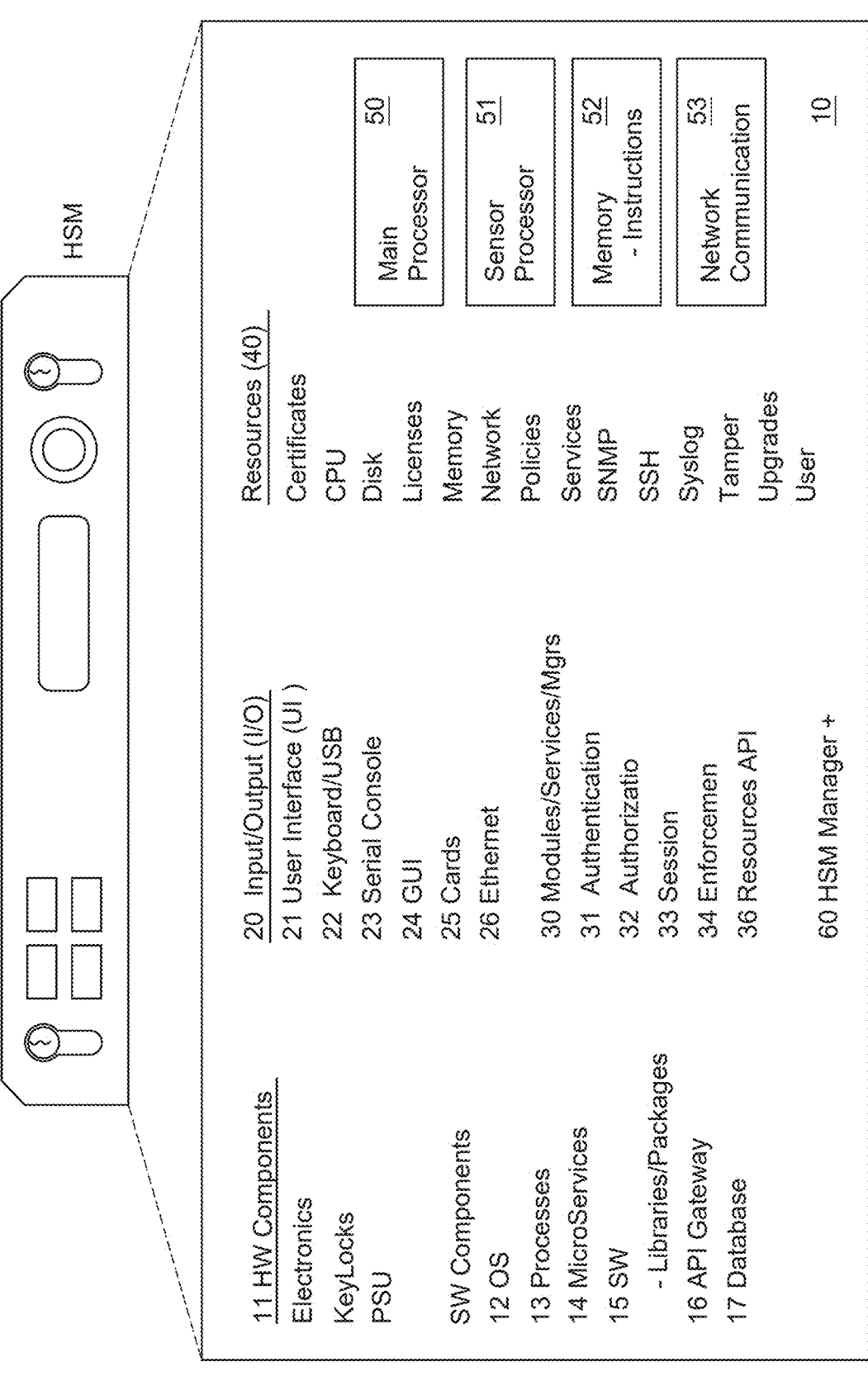
FIG. 4 depicts an exemplary diagrammatic representation of a machine and hardware platform suitable for use to perform the methods in accordance with some embodiments.

FIG. 4 depicts exemplary components of a Hardware Server Module (HSM) 10. The HSM 10 is a physical computing device that, among other capabilities, safeguards and manages digital keys, performs encryption and decryption functions for digital signatures, and provides for strong authentication and other cryptographic functions. It may exist in the form of a PCI plug-in card or an external hardware rack unit that attaches directly to a computer or network server within a data center. As a security hardened unit, the HSM 10 records tamper evidence, such as visible signs of tampering or logging and alerting, and provides for tamper responsiveness such as deleting keys upon tamper detection. The HSM 10 contains one or more secure crypto processor and sensor chips to prevent tampering and bus probing, or a combination of chips in a module that is protected by the tamper evident, tamper resistant, or tamper responsive packaging.

Briefly, a payment HSM is a hardened, tamper-resistant hardware device that is used primarily by the retail finance or banking industry to provide high levels of protection for cryptographic keys and customer PINs used during the issuance of magnetic stripe and EMV chip cards (and their mobile application equivalents) and the subsequent processing of credit and debit card payment transactions. Payment HSMs normally provide native cryptographic support for all the major card scheme payment applications and undergo rigorous independent hardware certification. Payment HSMs and management tools provide flexible, efficient transaction security for retail payment processing environments, internet payment applications, and web-based PIN delivery.

The main role of a payment HSM is to protect cryptographic keys and other security sensitive data in a highly secure manner, such that the integrity of the overall payment process is maintained, and provide audit and system logs of HSM usage. To that end, HSMs offer the highest level of security by always storing cryptographic keys in intrusion-resistant hardware and providing up to date reporting of its operation. Commonly, HSMs are housed in a data center of a computing resource provider or any similar securely hosting area. More specifically, any HSM hosted in the data center may be attached directly to a server, for instance in a rack, and can be accessed on-site by an operator e.g., through console attach to the HSM via a universal serial bus (USB) connection implementing a USB-C interface, for example.

Operational use of the HSM 10 is primarily by way of the components shown in the figure, but understandably, many more components, electronics, and modules are present in a typical HSM. Those components shown are those mostly related, and suitable for use, for implementing the foregoing inventive methods. Hardware (HW) components 11 represent general electronics for operating the HSM (e.g., processors, central processing units, security, sensors, memory, network devices, ports, power supply units (PSU), wires, keylocks, etc.). The Hardware also contains memory to run operating system and input-output (I/O) devices for interaction. It comprises different types of processors, such as a crypto processor, sensor processor, general processing unit (GPU), central processing unit (CPU) to assist in protection, management of keys and hardware acceleration with the operating system. The keys, or any other data, can be stored in the database for persistence. The hardware architecture is designed to protect and manage digital keys, and can perform encryption, decryption, digital signature generation and verification.

The Operating System (OS) 12 is a software component that executes on top of hardware, for example, the general processor, to manage hardware resources and peripherals, run HSM jobs/processes, and help in execution of other processes 13. Ubuntu is an exemplary OS that provides an embedded Linux distribution with libraries and packages. Ubuntu (GNU/Linux) is a multitasking Operating System capable of executing several processes (tasks) simultaneously. Different processes 13 for performing the HSM functions (data protection, key management, pin translations, etc.) are scheduled by the operating system 12. A thread is the basic unit to which the operating system allocates processor time. A process 13 is an instance of a computer program that is executed by one or many threads in the GPU or CPU. One or more threads run in the context of the process. A thread can execute any part of the process code, including parts currently being executed by another thread.

Certain HSM functionality and capabilities are configured as micro-services. Micro-services are independent and lightweight processes designed to perform specific tasks. They are typically handled and managed within the HSM by way of the OS 12. Micro-services 14 can communicate with each other and with external systems over specialized protocols and application programming interface (API) 16. Micro service are built using software libraries/packages 15, which are a self-contained set of independent and interchangeable software component that implement a specific functionality. Micro-services 14 and Processes 13 are built using these software libraries/packages 15. By way of these microservices, applications can implement a third-party Microservice provider's generic API to a service to deliver Payment HSM capabilities. In this manner, for example, a $3^{rd}$ party customer by way of APIs can partition their workload to optimized payment HSMs for performing specific tasks (e.g. ECC/RSA key gen, PIN translations, etc.) according to their microservice model.

The Applications Programming Interface (API) gateway 16 provides a connection between computers or between computer programs/applications, and/or between computers and people. It is a type of software interface, offering a service to other pieces of software. The API provides a communication channel between HSM components, internal processes 13 and/or micro services 14. These APIs are exposed on top of input/output (I/O) 20 interfaces. External systems and/or people communicate with HSM via the I/O interfaces 20, such as user interface (UI) 21. The HSM can also communicate with external systems through hardware IO interfaces, such as the keyboard 22, serial port 23, Ethernet, optical ports, USB ports, etc. External systems (host computers in a data center) can also talk to HSM software interface via APIs exposed on top of individual hardware interfaces (e.g., network device driver, disk/memory management, etc.).

The HSM 10 includes a local console 23 that is serial connected over e.g., a USB-C interface. The serial interface can be used by operations personnel, namely operators, referred to as DCOps (standing for Data Center Operations), who have physical access to the HSM for manually issuing commands to the HSM. Such USB-C interface is used, according to the standing state of the art, for all configuration throughout the HSM service, including initial configuration and cumbersome provisioning processes. The HSM also includes managerial Graphical User Interface (GUI) 24 that over an Ethernet 26 connection allow for remote configuration of the HSM. Also, the I/O 20 can be used to configure network settings, SSH certificates, upgrades, licenses and devices (e.g. CPU, Disk, memory, etc.). Operator (Java) cards 25 also provide a means for provisioning and securing the HSM using key shares and key splits.

The HSM also includes services 30 by way of modules, processes and service managers. Some services may be internal to the HSM, and others may be selectively exposed via the API gateway 16 to external entities or services. Examples of services 30 include authentication 31, authorization 32, session manager 33, enforcement 34, resource API manager 36, and HSM Manager 60, where the + (plus sign) denotes inclusion of other components previously described in the HSM. Accordingly, service managers can be invoked/managed/configured remotely (external) via their APIs, for example, from a web based GUI (e.g. payShield Manager) via Internet connection over Ethernet to the HSM 10.

The HSM also includes (internal) resources 40 which can be externally configured via the normal I/O interfaces 20, and also, for some, (internally and externally) via any of the module/service managers 30 and their respective APIs. Examples of HSM resources include, but are not limited to, certificates, licenses, policies, device management, services, upgrades and so on. Each resource 40 has a respective API for software modules, processes or microservices to interact with the respective resource. The HSM offers access and services to each resource 40 via the resources API 36. Aside from payments HSM related tasks (e.g. encryption/decryption, key management, etc.), this includes: certificate/license management, SNMP, SSH, memory management/configuration, network management/configuration, upgrade installations/services, user resources, and so on.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Scheme, Go, C++, C#, VB.NET, Python or the like, conventional procedural programming languages, such as the "C" programming language, Perl, PHP, dynamic programming languages such as Python, Ruby and Groovy, or other programming languages. The program code may execute entirely on the user's computer, partly on the user's computer, as a stand-alone software package, partly on the user's computer and partly on a remote computer, entirely on the remote computer or server, or within the Cloud or other computer network. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS), Platform as a Service (PaaS) for connecting mobile apps to cloud based services, and Security as a Service (SECaas).

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed, is:

1. An electronic hardware sub-system within a multi-tenant Hardware Security Module (HSM) suitable for use for tamper response against physical and logical attacks against the HSM, the electronic hardware sub-system comprising:

a Main Processor (MP) running an operating system (OS) that produces virtualized HSM instances (vHSMs) per tenant using virtualization technologies that are one among containers or micro Virtual Machines (uVMs) running crypto services logic;

a Sensor Processor (SP) communicatively coupled to said MP over a PCIe communication channel to provide tamper handling against physical and logical attacks of said virtualized HSM instances on said HSM; and, an HSM Manager executing in said MP to manage and orchestrate said vHSMs for dynamic fraud analysis by way of a Tamper Prevention System on the HSM, and communicatively coupled to crypto client applications operating as tenants and sending API commands to said multi-tenant HSM, detect any kind of intrusions that happen at an actual tenant level of crypto API services offered by the HSM to them, and then, identify, and separate out, affected API services of a particular tenant to isolate physical and logical attacks against other tenants, wherein the MP and SP are distinct hardware devices that each can include one or more Central Processing Units (CPUs) and memory coupled to the one or more CPUs where the memory includes computer instructions which when executed by the one or more processors causes the one or more processors to perform the operations related to fraud analysis, threat detection, and tamper management.

2. The electronic hardware sub-system of claim 1, wherein said HSM Manager provides a Hardware as a Service (HaaS) to said crypto client applications for each vHSM tenant by way of a Crypto API Service to both:

tenant users along a crypto services path in a Virtual Private Network (VPN) connection to the HSM; and tenant administrators along an administrative operations path in said VPN connection to the HSM, wherein said actual tenant level comprise data, access controls, security policies, and separate administration access assigned to a particular tenant vHSM.

3. The electronic hardware sub-system of claim 2, wherein said HSM Manager processes and responds to API commands said crypto client applications over a TCP/TLS connection per tenant for satisfying cryptographic service requests.

4. The electronic hardware sub-system of claim 2, wherein said Tamper Prevention System comprises:

a Physical Sensor process including voltage sensors, physical sensors, gryroscopic sensors and temperature sensors communicatively coupled to and controlled by said SP; and a Logical Sensor process including security controls, network security, behavioral security, and intrusion detection rules communicatively coupled to and controlled by said MP.

5. The electronic hardware sub-system of claim 4, wherein the Logical Sensor process implements an Extended Berkeley Packet Filter (eBPF) in a Linux Operating System on the MP for fraud analysis observability and tracing to detect fraud in a Multi-Tenant configuration of the HSM.

6. The electronic hardware sub-system of claim 4, wherein the Tamper Prevention System further comprises:

a Watchdog for detecting intrusions and declaring a Tamper Event; and a Tamper Enforcement Module to signal HSM Actors about a tamper state action responsive to said Tamper Event and intrusions, wherein said Tamper Prevention System runs on a separate hardware running its own kernel than said HSM.

7. The electronic hardware sub-system of claim 6, wherein said Tamper Event consists of:

a hard tamper system level to clear keys and shutdown the HSM for all tenants;

a soft tamper system level to delete root keys but preserve Tenants' keys intact;

a hard tamper tenant level to shutdown particular tenants and initiate soft tamper actions on other tenants; and a soft tamper tenant level to halt only crypto operations for a detected tenant of a respective vHSM and send an alert to the HSM to re-commission to become fully operational again.

8. The electronic hardware sub-system of claim 7, wherein said Tamper Enforcement Module generates a continuous tamper event matrix to identify threats and associated severities to determine an appropriate response to said Tamper Event, wherein Tamper Enforcement Module sends signals to individual vHSMs and underlying virtualized infrastructure, upon appropriate tamper event detection to stop processing crypto functions.

9. The electronic hardware sub-system of claim 6, wherein said HSM Actors comprise:

a crypto client application for calling crypto API over TCP/UDP/HTTP(s) for crypto operations on said HSM; and an administrator for management API over TCP/UDP/HTTP(s) for asset management of said HSM.

10. The electronic hardware sub-system of claim 6, wherein said HSM Actors comprise:

a Crypto API Service providing a virtualization layer to perform cryptographic operations starting from said HSM Manager; and a Data Storage for holding tenant keys to perform management operations starting from said HSM Manager, wherein said virtualization layer is managed by the HSM Manager acting on behalf of a platform operator.

11. The electronic hardware sub-system of claim 6, wherein said Watchdog:

monitors calls to said Crypto API Service within an operating system layer to identify system call behaviors;

monitors traffic from a caller to a callee function for said system calls at other layers, and identifies if that system call behavior is normal or an anomaly for said system calls.

12. A method suitable with an electronic hardware subsystem within a multi-tenant Hardware Security Module (HSM) for tamper response against physical and logical attacks against the HSM, the method comprising steps of:

by way of a Main Processor (MP), running an operating system (OS) that produces virtualized HSM instances (vHSMs) per tenant using virtualization technologies that are one among containers or micro Virtual Machines (uVMs) running crypto services logic;

by way of a Sensor Processor (SP) communicatively coupled to said MP over a PCIe communication channel, providing tamper handling against physical and logical attacks of said virtualized HSM instances on said HSM; and by way of an HSM Manager executing on said MP, managing and orchestrating said vHSMs for dynamic fraud analysis by way of a Tamper Prevention System on the HSM, and communicatively coupled to crypto client applications operating as tenants and sending crypto API commands to said multi-tenant HSM, detecting intrusions that happen at an actual tenant level of crypto API services offered by the HSM to them, and then, identifying, and separating out, affected API services of a particular tenant to isolate physical and logical attacks against other tenants.

13. The method of claim 1, further comprising, by way of a Watchdog, detecting intrusions and declaring a Tamper Event; and by way of a Tamper Enforcement Module, signaling HSM Actors about a tamper state action responsive to said Tamper Event and intrusions, wherein said Tamper Prevention System comprises said Watchdog and Tamper Enforcement Module that run on a separate hardware running its own kernel than said HSM.

14. The method of claim 12, further comprising:

clearing keys and shutting down the HSM for all tenants responsive to a hard tamper system level' deleting root keys while preserving Tenants' keys intact responsive to a soft tamper system level;

shutting down particular tenants and initiating soft tamper actions on other tenants responsive to a hard tamper tenant level; and halting only crypto operations for a detected tenant of a respective vHSM and send an alert to the HSM to re-commission to become fully operational again responsive to a soft tamper tenant level.

\*   \*   \*   \*   \*